(12) United States Patent
Callif et al.

(10) Patent No.: US 9,261,229 B2
(45) Date of Patent: Feb. 16, 2016

(54) SELF-PIERCING HANGING DEVICE

(71) Applicant: LIBERTY HARDWARE MFG. CORP., Winston-Salem, NC (US)

(72) Inventors: Adam Callif, Chicago, IL (US); Jessina Collins, Chicago, IL (US); Benjamin McDonald, Winston-Salem, NC (US); James Leroy Daniels, Stokesdale, NC (US)

( * ) Notice: Subject to any disclaimer, the term of this patent is extended or adjusted under 35 U.S.C. 154(b) by 23 days.

(21) Appl. No.: 14/260,700

(22) Filed: Apr. 24, 2014

(65) Prior Publication Data

US 2015/0308613 A1  Oct. 29, 2015

(51) Int. Cl.
*A47G 1/20* (2006.01)
*F16M 13/02* (2006.01)

(52) U.S. Cl.
CPC . *F16M 13/02* (2013.01); *A47G 1/20* (2013.01)

(58) Field of Classification Search
CPC ......... A47G 1/20; A47G 1/16; A47G 1/1686; A47G 1/22; A47G 3/00; A47G 25/0607; H02G 3/125; A47B 96/068
See application file for complete search history.

(56) References Cited

U.S. PATENT DOCUMENTS

| | | | |
|---|---|---|---|
| 769,794 A * | 9/1904 | Fowler | 248/489 |
| 1,343,855 A | 6/1920 | Tyler | |
| 2,317,368 A | 4/1943 | Frey | |
| 2,334,700 A | 11/1943 | Frey | |
| 2,539,825 A | 1/1951 | Genua | |
| 3,861,631 A | 1/1975 | Shorin | |
| 3,912,211 A | 10/1975 | Topf | |
| 3,966,157 A * | 6/1976 | Corral et al. | 248/217.3 |
| 4,124,189 A | 11/1978 | Einhorn | |
| 4,333,625 A * | 6/1982 | Haug | 248/216.1 |
| 4,422,608 A * | 12/1983 | Hogg | 248/205.4 |
| 4,485,995 A * | 12/1984 | Hogg | 248/218.1 |
| 4,655,423 A | 4/1987 | Schavilje et al. | |
| 5,878,988 A | 3/1999 | Rakower | |
| 8,398,048 B2 | 3/2013 | Popkin et al. | |
| 2008/0251682 A1 | 10/2008 | Repac | |
| 2014/0231604 A1* | 8/2014 | Long | 248/217.3 |

FOREIGN PATENT DOCUMENTS

| | | |
|---|---|---|
| FR | 2720614 A1 | 12/1995 |
| GB | 2235240 A | 2/1991 |
| WO | 9507039 A1 | 3/1995 |

* cited by examiner

*Primary Examiner* — Casandra Davis
(74) *Attorney, Agent, or Firm* — Lora Graentzdoerffer; Brooks Kushman P.C.

(57) ABSTRACT

A device to hang articles includes a base defining a generally flat body to engage a mounting surface and a hook protruding therefrom to hang an article. The device also includes a bracket pivotally attached to the base at a proximal end of the bracket and a piercing arm extending from a distal end of the bracket. Also, the bracket is adapted to pivot between a first position relative to the base where the piercing arm is retracted from the mounting surface, and a second position relative to the base where the piercing arm is inserted into the mounting surface to retain the device thereto.

16 Claims, 4 Drawing Sheets

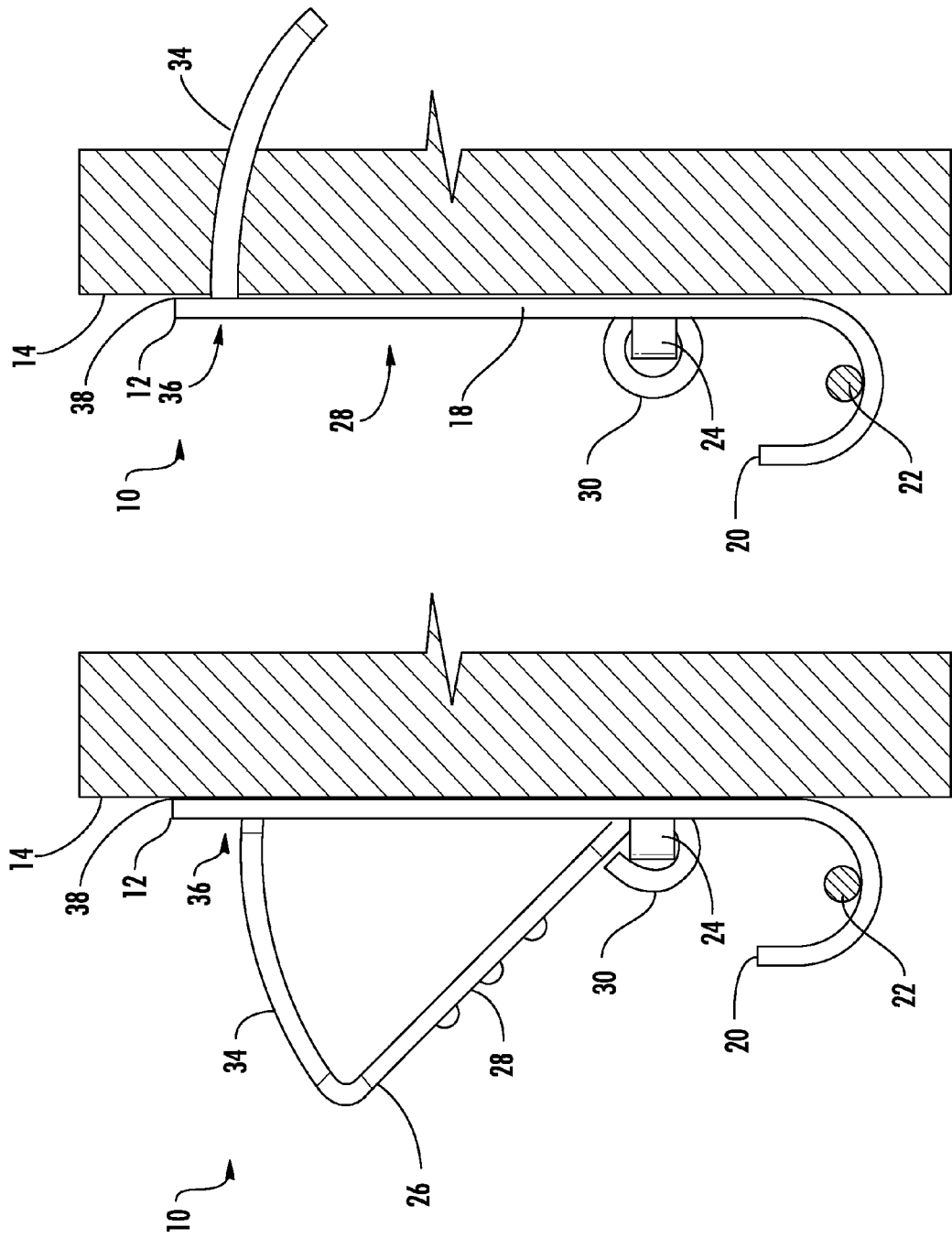

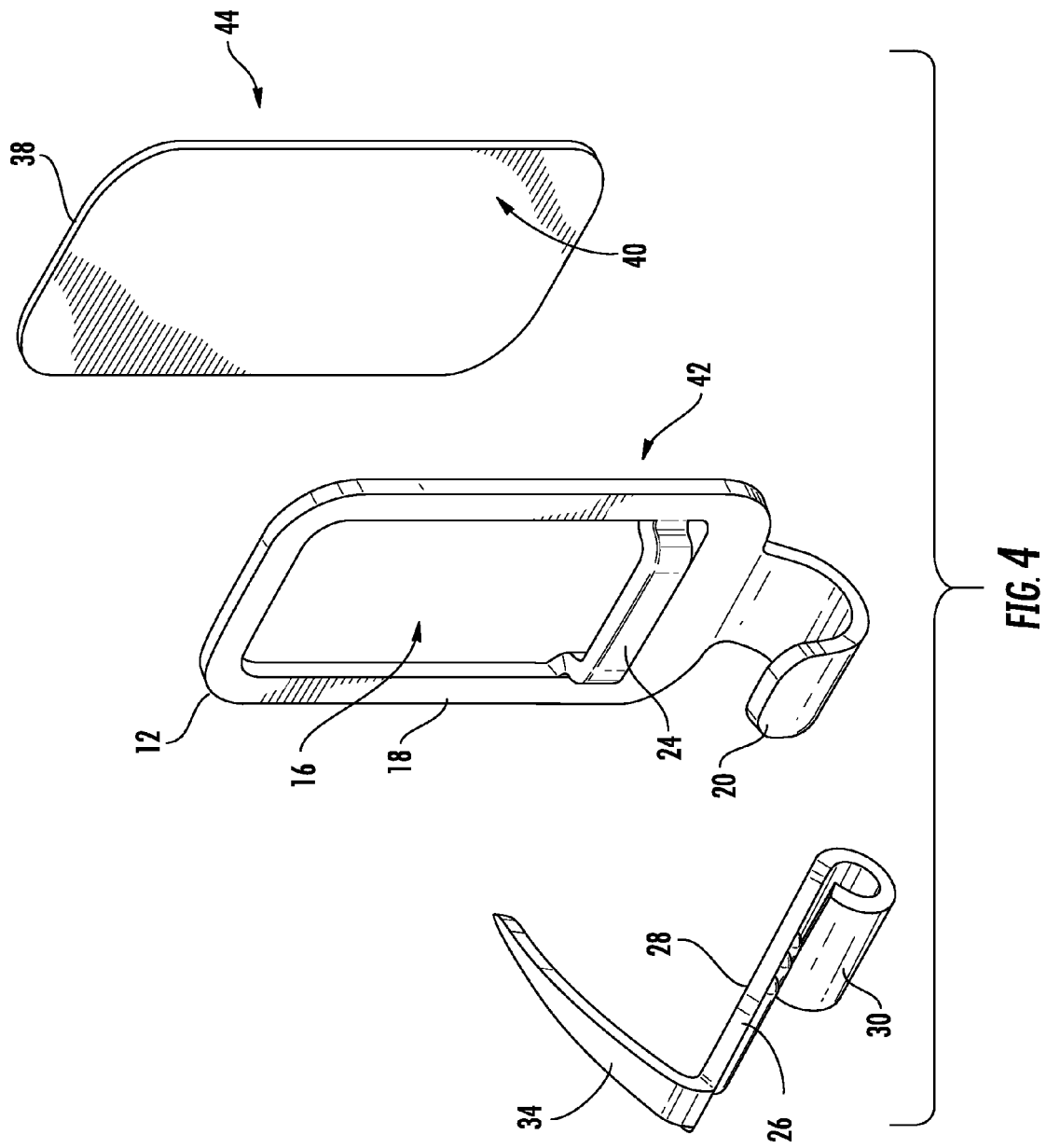

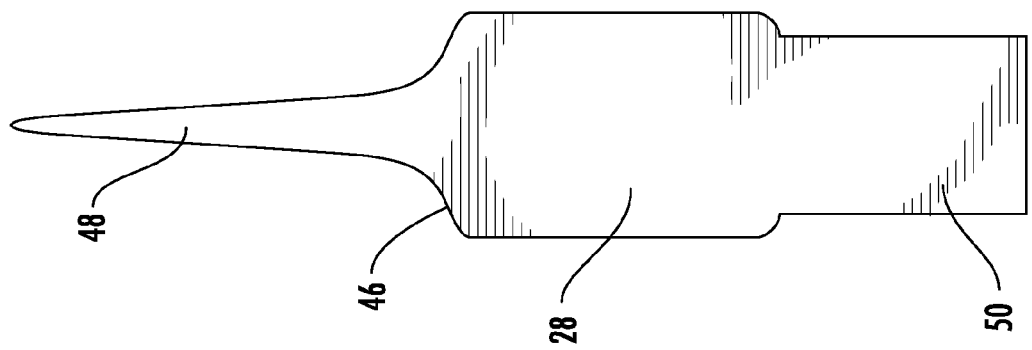
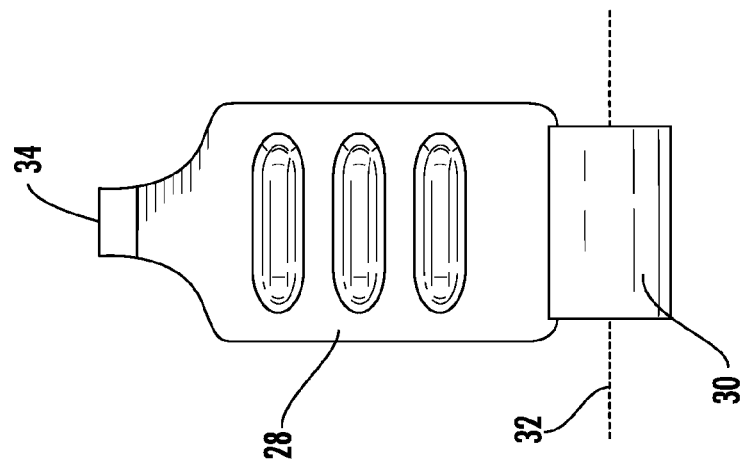
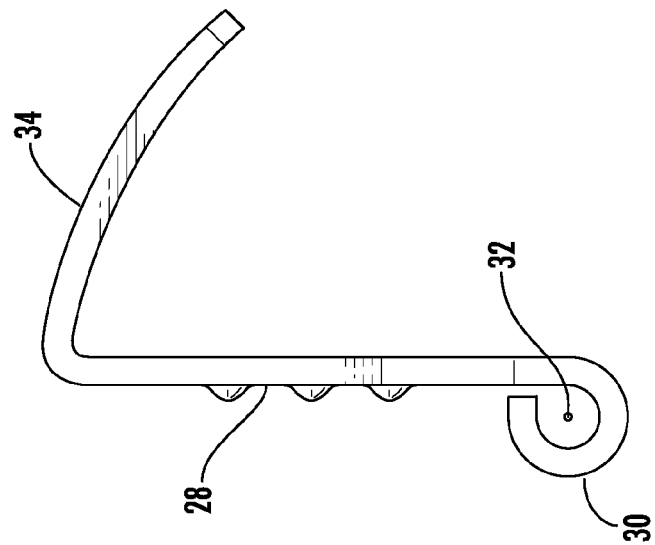
FIG. 5
FIG. 6
FIG. 7

SELF-PIERCING HANGING DEVICE

TECHNICAL FIELD

The present disclosure relates to a device for hanging articles.

BACKGROUND

Hanging articles against a mounting surface such as a wall generally includes affixing a hanging device to the mounting surface, then positioning the article to be suspended from the device. Often a separate nail or other fastener is required to retain the hanging device against the mounting surface.

SUMMARY

In at least one embodiment, a device to hang articles includes a base defining a generally flat body to engage a mounting surface and a hook protruding therefrom to hang an article. The device also includes a bracket pivotally attached to the base at a proximal end of the bracket and a piercing arm extending from a distal end of the bracket. Also, the bracket is adapted to pivot between a first position relative to the base where the piercing arm is retracted from the mounting surface, and a second position relative to the base where the piercing arm is inserted into the mounting surface to retain the device thereto.

In at least one embodiment, device to hang articles on a mounting surface includes a base defining an aperture through central portion with a hook protruding from an outer portion of the base. The device also includes a bracket attached to the base via a hinge at a proximal end, and a piercing arm at a distal end of the bracket opposite the hinge. The bracket is adapted to rotate about the hinge from a first position where the piercing arm is retracted from the mounting surface to a second position where the piercing arm protrudes through the aperture into the mounting surface thereby securing the device thereto.

In at least one embodiment a method of making a hanging device includes forming a base from a sheet material to include an aperture in a center portion, at least one material strip extending from the base, and an integral hook protruding from an outer edge of the base. The method also includes forming a puncture bracket from a sheet material having a piercing arm extending from a first end and a tab extending from a second end. The method further includes joining the puncture bracket to the base by wrapping the tab of the puncture bracket about the material strip of the base such that the puncture bracket is retained to the base and is rotatable about the material strip.

In further embodiments, the piercing arm may define an arcuate shape having a radius approximately equal to a distance between the piercing arm and a hinge such that a rotation of the bracket from the first position to the second position drives the piercing arm along an arc into the mounting surface.

In additional further embodiments, the bracket may include a tab that is formed in a generally circular loop about at least one hinge post of the base.

BRIEF DESCRIPTION OF THE DRAWINGS

FIG. 2 is a side view of the hanging device assembly of FIG. 1 where a puncture bracket is in a first position.

FIG. 3 is a side view of the hanging device assembly of FIG. 1 where the puncture bracket is in a second position.

FIG. 4 is an exploded view of the hanging device assembly of FIG. 1.

FIG. 5 is a front view of sheet material shape profile of a puncture bracket.

FIG. 6 is a front view of a formed puncture bracket.

FIG. 7 is a side view of the puncture bracket of FIG. 6.

DETAILED DESCRIPTION

Figure 1:
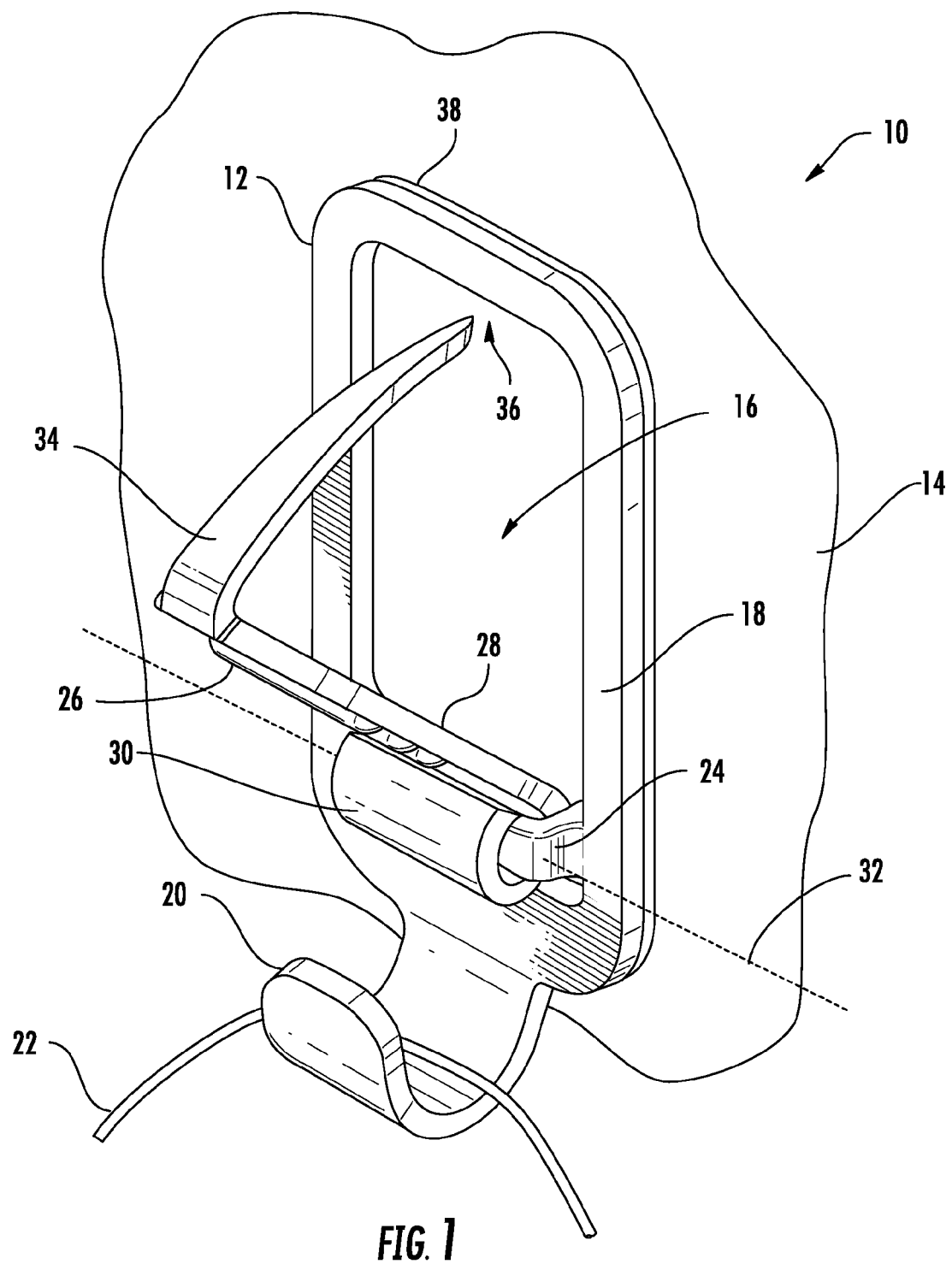
FIG. 1 is a perspective view of a hanging device assembly according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The separate nature of prior art hanging devices requiring a separate fastener may allow for a user to drop or lose the fastener during an attempt to affix the device to a mounting surface. Also, holding a hanging device in a precise position while driving the fastener can be cumbersome and susceptible to slippage of the position. Additionally, a separate fastener can become misplaced prior to a mounting attempt, forcing a user to seek a suitable replacement fastener to use with the hanging device.

Referring to FIG. 1, an improved assembly 10 for hanging articles is illustrated. The assembly 10 includes a generally flat base member 12 adapted to be affixed to a mounting surface 14. The base member 12 defines an aperture 16 formed through a center portion 18. The base member 12 also includes a hook feature 20 that is shaped to receive an article 22 to be hung. The base member 12 is further provided with at least one hinge post 24. In at least one embodiment, the hinge post 24 is a strip of material that spans across the aperture 16. In alternative embodiments hinge posts may have alternative locations, for example extending from the outside of the base member.

The assembly 10 also includes a puncture bracket 26 that is pivotally attached to the base member 12. The puncture bracket 26 includes a main portion 28, and at least one hinge 30 at a proximal end of the main portion 28. The hinge 30 is shaped to cooperate with the hinge post 24 of the base member 12. The puncture bracket 26 is rotatable about an axis 32 that is generally central to the hinge 30. A piercing arm 34 is disposed at a distal end of the main portion 28 of the puncture bracket 26. The piercing arm 34 is arranged to be generally perpendicular to the main portion 28. The piercing arm 34 is also provided with an arcuate shape having a radius of curvature that is approximately equal to the distance between the piercing arm 34 and the axis 32. In this way, the piercing arm 34 travels along a tangential path relative to the axis 32 when the puncture bracket 26 is rotated about the hinge 30.

Referring to FIGS. 2 and 3, the assembly 10 is configured to allow the puncture bracket 26 to rotate across a plurality of positions. The puncture bracket 26 defines a first position where the piercing arm 34 is retracted from the mounting surface 14. Upon installation, a user may drive the puncture bracket 26 from the first position to a second position where the piercing arm 34 is inserted into the mounting surface 14. The insertion of the piercing arm 34 into the mounting surface helps to retain the assembly 10 to the mounting surface 14. The arcuate shape of the piercing arm forms a similarly shaped arcuate hole in the mounting surface. Since the piercing arm is driven by rotation, the curvature allows for a cleanly driven hole with less distortion or tearing. Additionally, the arcuate curvature of the piercing arm further enhances the retention strength of the assembly 10 against linear loads, since rotation is required to retract the piercing arm.

As can be particularly seen from FIG. 3, the strip of material operating as the hinge post 24 is offset from a flat plane of the center portion 18 of the base member 12. Therefore the hinge 30 of the puncture bracket 26 has clearance to rotate freely once the base member 12 is affixed to the mounting surface 14. As discussed above, the puncture bracket 26 is driven into the mounting surface when rotating from the first position to the second position. Once in the second position, the main portion 28 is substantially coplanar with respect to the center portion 18 of the base member 12.

In alternative embodiments, the piercing arm 34 engages an upper edge 36 of the aperture 16 as the puncture bracket 26 is driven into the second position. In this way, contact between the base member 12 and the engaged piercing arm 34 allows vertical loads from the weight of the hanging article 22 to be transferred more directly into the mounting surface 14, as opposed to loading the full weight of the hanging article 22 upon the hinge 30 of the puncture bracket 26.

The assembly 10 is also provided with an adhesive pad 38 to hold the assembly 10 in place against the mounting surface 14 when the puncture bracket 26 is in the first position. In at least one embodiment, the adhesive pad 38 is a double-sided tape. For example, the tape may be adhered on a first side 40 to a back portion 42 of the base member 12. To facilitate packaging and shipping, the tape may be provided with a release liner to protect a second side 44 of the tape to be adhered to the mounting surface 14. At the time of installation, the release liner may be removed, and the assembly 10 temporarily adhered to the mounting surface 14 at a permanent location desired by a user. By temporarily adhering the assembly 10 to the mounting surface 14, a final position may be established in advance of driving the puncture bracket 26 thereby avoiding slippage of the position of the assembly 10 during insertion of the piercing arm 34.

Referring to FIG. 4, it may be seen that the adhesive pad 38 may be a single sheet that covers the aperture 16 when assembled to the base member 12. This may provide a greater area of adhesion with respect to the mounting surface 14. The piercing arm 34 may therefore protrude through the adhesive pad 38 upon installation. Although the mounting pad is shown as uniform sheet, it is contemplated that the adhesive pad may be also provided with an aperture near the center portion to correspond with the aperture 16 of the base member 12.

Referring to FIGS. 5 through 7, the puncture bracket 26 may be formed from a sheet material blank. More particularly, metal stampings may be suitable according to aspects of the present disclosure. However, it is contemplated that other formable materials may also serve as alternatives. A shape profile 46 may be punched out of a flat sheet of material. The shape profile 46 includes a tapered tip 48 extending from a first end, and a tab 50 extending from a second end. The tapered tip 48 may be bent to be approximately perpendicular to the main portion 28 of the puncture bracket 26 to comprise the piercing arm 34. The bending of the tapered tip 48 may additionally impart an arcuate shape upon the piercing arm 34. As discussed above, the piercing arm 34 may be formed along a generally constant radial distance from an axis of rotation.

Upon assembly of the puncture bracket 26 to the base member 12, the tab 50 may be wrapped in a generally circular loop about the hinge post 24 to form the hinge 30. An internal dimension of the hinge 30 includes sufficient clearance to allow the puncture bracket to rotate freely relative to the base member 12. Also, an approximate center of the circular loop of the hinge 30 effectively becomes the axis 32 about which the puncture bracket may rotate.

Similarly, the base member 12 may also be formed from a flat sheet material such as a stamping. An outer profile, as well as the aperture 16, of the base member 12 may be punched out of the flat sheet. Also, a strip of material serving as the hinge post 24 may be formed by pressing for example to be offset a distance away from a plane of the center portion 18 of the base member 12. A tab extending from one edge may be formed to include curvature to make up the hook feature 20.

In alternative embodiments, the base member may not include an aperture. One or more hinge posts may be provided to extend from an exterior edge of the base member. For example a pair of opposing co-axial hinge posts may be suitable. A puncture bracket may be adapted to cooperate with the external hinge posts such that the bracket may rotate from a first position to a second position where a main portion is substantially coplanar with a center portion of the base member. One way this may be achieved is that the puncture bracket may have two hinges corresponding to the pair of opposing co-axial hinge posts. A single axis of rotation allows the puncture bracket to pivot between the first position and the second position. The main portion of the puncture bracket may comprise two legs extending adjacent to opposing outer edges of the base member, and a bridging portion connecting the two legs above a top edge of the base member. In this way, the puncture bracket may extend about the exterior of the base member and maintain similar functionality as described in reference to previous embodiments. One or more piercing arms may be provided along an outer edge of the puncture bracket to be driven into the mounting surface as the puncture bracket rotates from the first position to the second position.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device to hang articles comprising:
a base defining a generally flat body to engage a mounting surface and a hook protruding from the body to hang an article, the base further defining an aperture through the body and a hinge post spanning across the aperture and spaced from an edge of the aperture:
a bracket pivotally attached to the base at a proximal end of the bracket; and
a piercing arm extending from a distal end of the bracket, wherein the bracket is pivotal between a first position relative to the base where the piercing arm is retracted from the mounting surface, and a second position where the piercing arm is inserted into the mounting surface to retain the device thereto.

2. The device of claim 1 further comprising an adhesive pad affixed to the base to temporarily hold the base against the mounting surface when the bracket is in the first position.

3. The device of claim 1, wherein the piercing arm defines an arcuate shape having a radius approximately equal to a distance between the piercing arm and an axis of rotation such that pivoting the bracket from the first position to the second position drives the piercing arm along an arc into the mounting surface.

4. The device of claim 1 wherein the piercing arm is abutted against an edge of the base adjacent the aperture when driven from the first position to the second position.

5. The device of claim 1, wherein the bracket further defines a hinge formed at the proximal end and wrapped about the hinge post.

6. The device of claim 1 wherein the bracket is formed from a sheet material blank and the piercing arm is bent generally perpendicular to a main portion of the bracket.

7. The device of claim 1 wherein the base comprises at least one hinge post protruding from an outer portion of the body and wherein the bracket is formed to wrap about the at least one hinge post.

8. A device to hang articles on a mounting surface comprising:
   a base formed from a flat sheet material defining an aperture through a central portion and an integrally formed strap that spans across the aperture and spaced from an edge of the aperture forming at least one hinge post, with a the base further defining an integrally formed hook protruding from an outer edge of the base:
   a bracket attached to the base via a hinge at a proximal end; and
   a piercing arm at a distal end of the bracket opposite the hinge, wherein the bracket is adapted to rotate about the hinge post from a first position where the piercing arm is retracted from the mounting surface to a second position where the piercing arm protrudes through the aperture into the mounting surface thereby securing the device thereto.

9. The device of claim 8 wherein the hinge of the bracket is formed to wrap about the at least one hinge post.

10. The device of claim 8 further comprising an adhesive pad affixed to the base to temporarily hold the base against the mounting surface when the bracket is in the first position.

11. The device of claim 8 wherein the piercing arm engages an edge of the aperture when the bracket is driven from the first position to the second position.

12. The device claim 8 wherein the piercing arm defines an arcuate shape having a radius approximately equal to a distance between the piercing arm and the hinge such that rotation of the bracket from the first position to the second position drives the piercing arm along an arc into the mounting surface.

13. The device of claim 8 wherein the bracket is formed from a flat sheet material and the piercing arm is bent from an edge at the distal end and wherein the hinge of the bracket further comprises at least one generally circular loop wrapped about the at least one hinge post of the base.

14. A method of making a hanging device comprising:
   forming a base by stamping a sheet material and punching an aperture in a center portion of the base, the base including at least one material strip extending from the base and spanning across the aperture and spaced from an edge of the aperture, and an integral hook protruding from an outer edge;
   forming a puncture bracket from a sheet material having an arcuate piercing arm extending from a first end and a tab extending from a second end; and
   wrapping the tab of the puncture bracket about the material strip of the base such that the puncture bracket is retained to the base and is rotatable about the material strip.

15. The method of claim 14 wherein wrapping the tab of the puncture bracket comprises forming a generally circular loop.

16. The method of claim 14 wherein forming the puncture bracket comprises bending the arcuate piercing arm along a generally constant radial distance from an axis concentric with the material strip of the base.

* * * * *